3,556,895
BONDING POLYAMIDE ARTICLES BY GASEOUS SULFUR DIOXIDE AND CHLORINE
William C. Mallonee, Chapel Hill, N.C., assignor to Monsanto Company, St. Louis, Mo., a corporation of Delaware
No Drawing. Filed Nov. 4, 1968, Ser. No. 773,352
Int. Cl. C09j 5/00
U.S. Cl. 156—306                                    10 Claims

ABSTRACT OF THE DISCLOSURE

Touching polyamide shaped articles, such as filaments, films, small pellets or granules and the like, are bonded along their contiguous surfaces by the absorption and subsequent desorption of a gaseous mixture of sulfur dioxide and chlorine to form products including bonded nonwoven fabrics, porous pellicles and the like.

BACKGROUND OF THE INVENTION

(1) Field of invention

This invention relates to a method of bonding polyamide shaped structures and, more specifically, a method of bonding polyamide filaments by means of gaseous sulfur dioxide and chlorine to produce non-woven fabrics.

(2) Description of the prior art

The filaments comprising a non-woven fabric have in the past been bonded by the use of external binders or by softening the filaments with heat, solvent or plasticizer and subjecting them to pressure while in the softened state. The external binder may be an adhesive substance which is cured after the application thereof or it may be rendered adhesive after application by use of heat, solvent or plasticizer. External binders may be applied as powders, solutions, emulsions or even in the form of fibers; however, these methods suffer from several disadvantages. The use of an outside binder presents problems in uniform applications and limits the properties of the entire web to those of the binder. Thus, for example, if a fiber with a relatively low melting point is used as a bonding material, the temperature conditions to which the web or resulting fabric may be subjected are limited by the melting point of the binder fibers.

Solvent bonding by the previous methods is not easily controlled and frequently tends to alter the aesthetic properties of the web. For example, achieving adequate adhesiveness in the filaments without dissolving the entire web or at least impairing the physical properties thereof is difficult. Furthermore, the intersections at which the filaments are bonded frequently have a swollen appearance which evidences the solution and redeposition of polymer which is generally referred to as polymer migration. In most instances, these swollen areas around the bonds do not possess the same dye acceptance level because of changes in the crystalline structure which is localized at the bond site thereby causing non-uniform dyeing.

In an application filed on June 17, 1968, having Ser. No. 737,507, the bonding of polyamide fibers and articles by means of a hydrogen halide gas or boron trifluoride was disclosed. While these gases adequately bond polyamide fibers, the substitution of a gaseous mixture of sulfur dioxide and chlorine made the process more economical. Further, tenacity of the resulting bonded web was improved.

SUMMARY OF THE INVENTION

In its broadest aspects, the present invention comprehends the bonding of two touching polyamide articles along their contiguous surfaces by exposure to an activator such as a gaseous mixture of sulfur dioxide and chlorine followed by desorbing or removing the gas. Preferably, the activating gas should be maintained at about 20 to 25° C. for uniform treating conditions and handling convenience although bonding can be accomplished at substantially higher and lower temperatures.

Neither sulfur dioxide or chlorine gases were known to have a plasticizing or solvating effect on polyamide articles such as nylon filaments. While chlorine gas may be partially absorbed by nylon, no disruption of the intermolecular hydrogen bonds between adjacent amide groups occurred; therefore, the nylon articles were not adaptable for bonding. Further, sulfur dioxide was found to have absolutely no effect on polyamide articles and, thus, could not be expected to produce the desired bonding. It can be seen that the bonding of polyamide articles by a combination of gases which individually have no lasting effect on the polyamide articles is quite surprising and can best be explained as a synergistic action.

To obtain this bonding reaction, the structures must be touching. In the case of two intersecting filaments which may be staple or continuous, it may be desired to place the filaments under tension. For example, in a mat of filaments, the tension may be accomplished by shrinking the entangled filaments after the mat has been formed or by subjecting the mat to pressure. Pressing of the mat can precede or follow exposure to the gaseous mixture. In practice, the "pre-press" has the advantage in that the pressing equipment need not be exposed to the gaseous mixture. Postpressing, however, has the advantage of imparting greater strength to the mat because of an increase in pressure imposed on the filament intersections.

The discovery has been made that polymers which can be self-bonded by means of being subjected to a gaseous mixture of chlorine and sulfur dioxide have in common in their structure the —NHCO— group. In order to exhibit this bonding property, the polymer needs an adequate concentration of the groups which are accessable to the gaseous mixture. It has been found that polyamides containing some aromatic groups will undergo this bonding reaction but certain wholly aromatic polyamides do not undergo the reaction despite concentrations of —NHCO— groups comparable to that in polyhexamethylene adipamide (nylon 66) which bonds very easily. This may result from the rigidity of the structure or from the effect of the aromatic rings on the basicity of the amide groups or a combination of these effects.

With the foregoing problems in mind, it is a primary object of this invention to provide bonded polyamide articles and blends thereof which are free from external bonding agents and visible polymer migration at the bonding point by means of subjecting the articles to a gaseous mixture comprised of sulfur dioxide and chlorine.

Another object of this invention is to bond shaped polyamide structures being free of external bonding agents in the final products without altering the geometry of the structures and without visibly building up an access of the polymer at the bond points.

A further object of this invention is to prepare drapable self-bonded, non-woven fabric structures suitable for use in clothing applications.

Still another object of this invention is to bond touching polyamide granules together by means of the gaseous mixture to form a porous board.

Other objects and advantages of the present invention and their means of attainment will be apparent from the following description and accompanying examples.

DETAILED DESCRIPTION OF THE PREFERRED EMBODIMENTS

It is contemplated that the bonding of a fibrous web may be carried out in a continuous process. Freshly spun nylon filaments are extruded through a conventional spinnerette and are attenuated by an air jet blast and formed into a random web on a moving foraminous belt. The web is then carried through an enclosed chamber through which the gaseous mixture is passed. After exposure to the gas, the web is passed into a second chamber where the gaseous mixture is desorbed by heat.

It is not essential that the web of this invention be comprised of polyamide filaments only. Other filaments which are chemically inert to the gaseous mixture of chlorine and sulfur dioxide may be blended with the nylon filaments to provide fabrics having different physical properties. The webs can be prepared from continuous filaments of nylon and at least one other filament-forming material which is spun simultaneously therewith. These filament-forming materials include synthetics such as polyester, acrylics, polyolefins and elastomeric filaments such as spandex and artificial filaments such as rayon and acetate. If desired, the web may be prepared by known methods of blending staple fibers from staple fiber blends which include the above materials and also natural fibers such as cotton and wool. Web formation of staple fibers may be accomplished on a Rando-webber or conventional carding machine to form single layered or multi-layered webs. Entanglement of the fibers comprising the web can be achieved by needle punching to cause intensification. Where the webs which contain nylon filaments is exposed to the gaseous mixture, the nylon filaments bond to one another so that the other filaments are held together by physical entrapment. The entrapment however permits limited movement of the unbonded filaments which produces better flexibility. As would be expected, the strength of the bonded webs or fabrics decreases with the decrease in percentage of the nylon filament content in the blend.

EXAMPLE I

Webs of continuous filament nylon 66 (polyhexamethylene adipamide) were made by rapidly attenuating the filaments directly from a melt spin jet and forming a nonwoven layer of continuous filaments on a foraminous screen. The non-woven fabric was cut into swatches measuring 8 inches by 1 inch and were exposed to a gaseous mixture comprised of 50% sulfur dioxide and 50% chlorine. The ratio of the gas in grams to the grams of nylon treated was 1:1. Desorption was carried out in an infra red oven at 90° C., 100° C., and 110° C. for 20 seconds at each temperature level. The physical properties of the tested fabric were determined by using a Hounsfield Tensile Tester for determining breaking strengths and elongation and the countilever bending lengths were determined as specified by the ASTM standard D1388–64. The weight of the fabric was measured at 2.61 ounces per square yard and the thickness was measured at 5.8 mils. Tenacity of the fabric was measured to be 8.57 lbs./in./oz./yd$^2$. in the machine direction and 8.76 lbs./in./oz./yd.$^2$ in the transverse direction. The elongation in the machine direction was 57% and the elongation in the transverse direction was 50%. The bending length in the machine direction was 1.24 ins. and was 1.20 ins. in the transverse direction. It can be seen from the above data that the non-woven fabric was adequately bonded.

TABLE I

| Example | $SO_2:Cl_2$ (ratio) | Gas: Nylon 66 (ratio) | Testing direction | Web weight (oz./yd.$^2$) | Web thickness (mils) | Web tenacity (lbs./in./ oz./yd.$^2$) | Elongation (percent) | Bending length (ins.) |
|---|---|---|---|---|---|---|---|---|
| II | 1:1 | 1:1 | M | 2.61 | 5.8 | 8.57 | 57 | 1.24 |
|    |     |     | T | 2.79 | 6.0 | 8.76 | 50 | 1.20 |
| III | 1:1 | 1:1 | M | 2.42 | 4.8 | 8.23 | 64 | 1.25 |
|     |     |     | T | 2.51 | 5.0 | 9.26 | 66 | 1.21 |
| IV | 1:1 | 0.5:1 | M | 2.61 | 5.2 | 8.72 | 72 | 1.25 |
|    |     |       | T | 2.66 | 6.0 | 10.20 | 81 | 1.30 |
| V | 1:1 | 0.25:1 | M | 2.60 | 5.7 | 8.29 | 50 | 1.20 |
|   |     |        | T | 2.41 | 5.0 | 10.20 | 56 | 1.22 |
| VI | 1:3 | 1:1 | M | 2.93 | 6.5 | 6.85 | 51 | 1.30 |
|    |     |     | T | 2.53 | 5.0 | 9.45 | 58 | 1.30 |
| VII | 1:3 | 0.5:1 | M | 2.75 | 6.0 | 7.40 | 52 | 1.20 |
|     |     |       | T | 2.73 | 6.5 | 8.83 | 63 | 1.40 |
| VIII | 3:1 | 1:1 | M | 2.82 | 8.5 | 8.44 | 62 | 1.50 |
|      |     |     | T | 2.82 | 7.3 | 7.89 | 56 | 1.40 |
| IX | 3:1 | 0.5:1 | M | 2.77 | 7.0 | 7.33 | 45 | 1.40 |
|    |     |       | T | 2.88 | 6.3 | 9.95 | 65 | 1.40 |

In comparing Examples IV and V with Examples II and III, it is observed that the tensile strength in the machine direction increases slightly and that the tensile strength in the transverse direction increases substantially as the ratio in pounds of the gaseous mixture to nylon 66 is decreased. However, adequate bonding occurs in all cases where the ratio of gas to nylon on a poundage basis is at least 0.25 to 1.

In Examples VI through IX, adequate bonding occurs even though the ratio of sulfur dioxide and chlorine vary relative to each other and even though the gas to nylon ratio varies.

TABLE II

| Gas | Percent $SO_2$–$Cl_2$ | Gas: Nylon 66 (ratio) | Testing direction | Weight (oz./yd.$^2$) | Thickness (mils) | Tenacity (lbs./in./ oz./yd.$^2$) | Elongation (percent) | Bending length (ins.) |
|---|---|---|---|---|---|---|---|---|
| X—$N_2$ | 50 | 1:1 | M | 2.66 | 6.0 | 3.15 | 21 | 1.30 |
|         |    |     | T | 2.65 | 6.2 | 3.35 | 18 | 1.40 |
| XI—air | 50 | 1:1 | M | 2.54 | 6.2 | 2.52 | 18 | 1.30 |
|        |    |     | T | 2.59 | 5.5 | 4.46 | 29 | 1.30 |

In Examples X and XI where equal moieties of sulfur dioxide and chlorine were diluted with nitrogen and air, respectively, tenacity was substantially reduced in comparison with Examples I through IX. Even though tenacity was low, such resulting webs are entirely adequate for selected end uses for bending lengths were increased.

The process of this invention provides a novel and improved method for bonding fibrous webs and the like. Articles of this type do not contain an external binder and therefore have the advantage of being constructed from 100 percent fiber content. The fabrics are not limited to special treatments which may adversely affect the binders heretofore used to bond non-woven structures. Thus, the fabrics and other bonded articles of this invention have more of the desirable properties and characteristics of woven fabrics than the conventionally bonded non-wovens.

Many different articles may be made by practicing the process of this invention without departing from the scope and spirit thereof. Therefore, it is to be understood that

I claim:

1. A process for bonding touching polyamide articles along their contiguous surfaces comprising the steps of contacting said polyamide articles with a gaseous mixture, said gaseous mixture being comprised of sulfur dioxide and chlorine and desorbing said gaseous mixture from said articles.

2. The process of claim 1 wherein said touching polyamide articles are in filament form.

3. The process of claim 2 wherein said gaseous mixture is comprised of at least about 25% sulfur dioxide and at least about 25% chlorine on a mole basis.

4. The process of claim 2 wherein said gaseous mixture consists of sulfur dioxide and chlorine.

5. The process of claim 4 wherein said sulfur dioxide constitutes at least about 25% of said gaseous mixtures.

6. The process of claim 4 wherein said chlorine constitutes at least about 25% of said gaseous mixture.

7. The process of claim 3 wherein said gaseous mixture is comprised of less than about 50% air.

8. The process of claim 3 wherein said gaseous mixture is comprised of less than about 50% nitrogen.

9. The process of claim 2 wherein said polyamide filaments are subjected to pressure prior to being contacted with said gaseous mixture.

10. The process of claim 2 wherein said polyamide filaments are subjected to pressure subsequent to being contacted with said gaseous mixture.

References Cited

UNITED STATES PATENTS

| | | | |
|---|---|---|---|
| 3,184,358 | 5/1965 | Utz | 156—306X |
| 3,235,426 | 2/1966 | Bruner | 156—307X |
| 3,276,944 | 10/1966 | Levy | 156—306X |

REUBEN EPSTEIN, Primary Examiner

U.S. Cl. X.R.

111—150